United States Patent
Kaiser

(10) Patent No.: US 11,959,546 B2
(45) Date of Patent: Apr. 16, 2024

(54) DRIVE, COUPLING ELEMENT AND METHOD FOR OPERATING A DRIVE

(71) Applicant: SaLa drive GmbH, Grieskirchen (AT)

(72) Inventor: Mario Kaiser, Wendling bei Haag (AT)

(73) Assignee: SALA DRIVE GMBH, Grieskirchen (AT)

( * ) Notice: Subject to any disclaimer, the term of this patent is extended or adjusted under 35 U.S.C. 154(b) by 185 days.

(21) Appl. No.: 17/639,350

(22) PCT Filed: Oct. 30, 2020

(86) PCT No.: PCT/EP2020/080591
§ 371 (c)(1),
(2) Date: Mar. 1, 2022

(87) PCT Pub. No.: WO2021/084107
PCT Pub. Date: May 6, 2021

(65) Prior Publication Data
US 2022/0299107 A1    Sep. 22, 2022

(30) Foreign Application Priority Data

Oct. 30, 2019   (WO) .................. PCT/EP2019/079611

(51) Int. Cl.
*F16H 61/04*    (2006.01)
*B60L 15/20*    (2006.01)
(Continued)

(52) U.S. Cl.
CPC ...... *F16H 61/0403* (2013.01); *B60L 15/2045* (2013.01); *F16H 3/089* (2013.01);
(Continued)

(58) Field of Classification Search
CPC ................. F16H 61/0403; F16H 3/089; F16H 2061/0422; F16H 2061/0474;
(Continued)

(56) References Cited

U.S. PATENT DOCUMENTS

| 3,896,914 A | 7/1975 | Konsbruck et al. |
| 5,498,216 A | 3/1996 | Bitsche et al. |

(Continued)

FOREIGN PATENT DOCUMENTS

| EP | 3 473 894 A1 | 4/2019 |
| FR | 2701679 A1 | 8/1994 |

(Continued)

OTHER PUBLICATIONS

International Search Report issued in International Patent Application No. PCT/EP2020/080591, dated Feb. 22, 2021, along with an English translation thereof.

(Continued)

*Primary Examiner* — Ha Dinh Ho
(74) *Attorney, Agent, or Firm* — GREENBLUM & BERNSTEIN, P.L.C.

(57) ABSTRACT

A drive with an electric motor and transmission connected to the electric motor at a drive shaft. Transmission has gears with different transmission ratios. The transmission performs a shifting process in which a coupling of the drive shaft, driven by the electric motor rotating at a first rotational speed, to the output shaft via a first gear with a first transmission ratio is first released, whereby the drive shaft is no longer rotationally coupled to the output shaft, after which the drive shaft is rotationally coupled to the output shaft via a second gear with a second transmission ratio. An electric synchronizing device is provided to change a rotational speed of the electric motor to a second rotational speed for a duration of the shifting process. The second rotational speed corresponds to the first rotational speed multiplied by a quotient of the second transmission ratio and first transmission ratio, and the drive is designed to produce a releasable rotational coupling between the drive shaft and the output shaft via the second gear by positive engagement.

(Continued)

The drive shaft is releasably coupled to the output shaft via a gear by at least one dog engaging a depression in a window extending along a direction of an element coupled to the drive shaft movable relative to an element coupled to the output shaft when not coupled to the drive shaft during a shifting process, so that the dog is movable into the depression through the window.

33 Claims, 12 Drawing Sheets

(51) Int. Cl.
*F16H 3/089* (2006.01)
*F16H 63/30* (2006.01)

(52) U.S. Cl.
CPC .............. *F16H 2061/0422* (2013.01); *F16H 2061/0474* (2013.01); *F16H 2063/3093* (2013.01); *F16H 2200/0021* (2013.01); *F16H 2200/0034* (2013.01)

(58) Field of Classification Search
CPC ..... F16H 2063/3093; F16H 2200/0021; F16H 2200/0034
USPC ........................................... 74/339, 661, 335
See application file for complete search history.

(56) References Cited

U.S. PATENT DOCUMENTS

| | | | |
|---|---|---|---|
| 5,827,148 A | | 10/1998 | Seto et al. |
| 9,303,731 B2* | | 4/2016 | Martin .................... F16H 3/083 |
| 9,377,061 B2* | | 6/2016 | Kimes .................. F16D 27/108 |
| 9,394,973 B1* | | 7/2016 | Theobald .............. F16H 3/0915 |
| 9,651,131 B2* | | 5/2017 | Raghavan ............. F16D 27/118 |
| 10,145,451 B2* | | 12/2018 | Pyrhonen .............. F16D 27/108 |
| 10,788,125 B2* | | 9/2020 | Takeuchi ................ F16D 11/10 |
| 2014/0228169 A1 | | 8/2014 | Leiber et al. |
| 2018/0112770 A1 | | 4/2018 | Hansson et al. |
| 2019/0078686 A1 | | 3/2019 | Retsch |
| 2020/0238973 A1 | | 7/2020 | Piracha |

FOREIGN PATENT DOCUMENTS

| | | |
|---|---|---|
| WO | 2013/072609 A1 | 5/2013 |
| WO | 2016/177392 A1 | 11/2016 |
| WO | 2019/141684 A1 | 7/2019 |

OTHER PUBLICATIONS

Written Opinion of the International Searching Authority issued in International Patent Application No. PCT/EP2020/080591, dated Feb. 22, 2021.

* cited by examiner

DRIVE, COUPLING ELEMENT AND METHOD FOR OPERATING A DRIVE

CROSS-REFERENCE TO RELATED APPLICATIONS

The present application is a U.S. National Stage of International Patent Application No. PCT/EP2020/080591 filed Oct. 30, 2020, and claims priority of International Application No. PCT/EP2019/079611 filed Oct. 30, 2019, the disclosures of which are expressly incorporated by reference herein in their entireties.

BACKGROUND OF THE INVENTION

1. Field of the Invention

The invention relates to a drive with an electric motor and a transmission to which the electric motor is connected at a drive shaft, in particular for an electric vehicle, wherein the transmission comprises at least two gears with different transmission ratios, via which an output shaft can be alternately coupled to the drive shaft in order to achieve different transmission ratios of a rotational speed of the drive shaft to a rotational speed of the output shaft, wherein the transmission is designed to carry out a shifting process in which a coupling of the drive shaft, driven by the electric motor rotating at a first rotational speed, to the output shaft via a first gear with a first transmission ratio is first released, so that the drive shaft is no longer rotationally coupled to the output shaft, after which the drive shaft is rotationally coupled to the output shaft via a second gear with a second transmission ratio, wherein an electric synchronizing device is provided with which a rotational speed of the electric motor can be changed to a second rotational speed for a duration of the shifting process, wherein the second rotational speed corresponds to the first rotational speed multiplied by the quotient of the second transmission ratio and first transmission ratio, wherein the drive is designed to produce a releasable rotational coupling between the drive shaft and the output shaft via the second gear by means of a positive engagement.

2. Discussion of Background Information

The invention further relates to a coupling element for a drive.

In addition, the invention relates to a method for operating a drive that comprises an electric motor and a transmission connected to the electric motor, wherein the transmission comprises at least two gears with different transmission ratios, via which an output shaft can be coupled to a drive shaft in order to achieve different transmission ratios of a rotational speed of the drive shaft to a rotational speed of the output shaft, wherein a shifting process occurs in that a rotational coupling of the drive shaft, driven by the electric motor rotating at a first rotational speed, to the output shaft via a first gear with a first transmission ratio is first released, so that the drive shaft is no longer rotationally coupled to the output shaft, after which the drive shaft is coupled to the output shaft via a second gear with a second transmission ratio.

From the prior art, various drives of the type named at the outset have become known which, however, are elaborate and costly to produce and only exhibit poor efficiency in an application.

For example, drives with electric motors have become known from the documents WO 2013/072609 A1, WO 2019/141684 A1, and FR 2 701 679 A1, in which a rotational speed of the electric motor is also changed during a shifting process to some extent.

From the document U.S. Pat. No. 5,827,148 A, a drive with a transmission comprising two gears has become known, wherein the motor is coupled to an output via depressions which engage in gaps either directly or via a two-stage cylindrical gear transmission.

The document US 2019/0078686 A1 discloses in particular a shifting device for a transmission for producing an engageable, rotationally fixed connection, alternatively between a first idler gear and second idler gear or between the first idler gear and a shaft. The connection thereby occurs using a gear shift sleeve that is constantly connected to a first idler gear in a rotationally fixed and simultaneously axially displaceable manner via extensions which positively engage in openings. Before the respective rotationally fixed connection is produced, the components involved are thereby synchronized, namely using a synchronizing device or an unsynchronized dog toothing.

However, the drives disclosed in these documents exhibit only poor efficiency and simultaneously long shifting times, so that they are not suitable for a comfortable driving experience, but instead cause a traction force disruption noticeable by a driver during a shifting process.

SUMMARY

This is addressed by the invention. The object of the invention is to specify a drive of the type named at the outset which can be produced in a particularly simple and cost-effective manner.

Furthermore, a coupling element shall be specified with which a drive shaft can be releasably coupled to an output shaft of a drive of this type via a gear.

Additionally, a method of the type named at the outset shall be specified which can be implemented in a cost-effective manner and can be carried out using a simply constructed drive.

The first object is attained according to the invention by a drive of the type named at the outset in which the drive shaft can be releasably coupled to the output shaft via a gear by means of at least one dog that engages in a depression, wherein the depression is arranged in a window which extends along a direction along which an element coupled to the drive shaft can be moved relative to an element coupled to the output shaft when the output shaft is not coupled to the drive shaft during a shifting process, so that the dog can be moved into the depression through the window from an uncoupled state.

In the course of the invention, it was found that the drive can be designed particularly simply and cost-effectively if a synchronization of the shaft connected to the motor with the shaft connected to the output does not occur mechanically in the transmission, for example as typically takes place via synchro rings or by means of friction in transmissions from the prior art, but rather if a synchronization occurs electrically, in that the electric motor is accelerated or decelerated to the corresponding speed, wherein the rotational speed of the electric motor is typically greater than zero before and after the shifting process. With a synchronous or asynchronous motor, this electric acceleration and deceleration can, for example, occur in a simple manner through a corresponding control of an inverter, with which a rotational speed of the motor is defined in the manner known from the prior art. Of course, a drive according to the invention can also be realized with a direct current motor. The transmission can then be designed without a corresponding and friction-based mechanical synchronizing device, so that said transmission can be designed not only to be cost-effective and simple, but also low-wear and small, especially since, in contrast to transmissions from the prior art, kinetic energy does not need to be converted, or must only be converted to a very minor extent, into heat in the transmission in order to achieve a synchronization when there is still a small relative speed despite the electric synchronization. Accordingly, the transmission can be designed with a smaller surface area, since only a smaller amount of heat needs to be emitted via the surface area. Given that the transmission does not need to be designed for a mechanical synchronization of the rotational speed of the motor, or for a mechanical acceleration and deceleration process by means of friction, the transmission can also be designed from materials that are simple and cost-effective to produce, for example from a case-hardened steel. According to the invention, a coupling of the drive shaft to the output shaft occurs by means of a positive engagement, whereby a particularly rapid engagement, in particular compared to typical frictionally engaged couplings from the prior art, is enabled.

It is beneficial if, for the purpose of producing a releasable rotational, positively engaged connection between the drive shaft and the output shaft, the drive comprises a rotatable first element with a window in which a stop is arranged and a rotatable second element with a protrusion, in particular a dog, that can be inserted into the window, wherein a rotational movement can be transmitted from the second element to the first element in positive engagement by means of the protrusion. The positive engagement for coupling a rotational movement of the drive shaft to the output shaft can thus take place in a simple manner by an insertion of the protrusion into the window. Typically, the protrusion is inserted into the window in that a distance between the first element and the second element is decreased in the direction of an axis about which the first element and the second element rotate, or in an axial direction, until the protrusion is positioned within the window. The protrusion can then be moved to the stop in that the second element is rotated relative to the first element about the axis.

The window is typically designed to be larger than the protrusion, so that the protrusion can easily be inserted into the window even in the case of a relative speed between the first element and second element about the axis. Furthermore, when the protrusion has already been inserted into the window, a relative motion between the protrusion and window is thus also still possible until the protrusion bears against the stop in the window, whereby the positive engagement occurs. For example, the window can be designed as an arc-shaped recess in the first element, in which recess the protrusion can engage, wherein the stop is formed by an end of the arc-shaped recess in a circumferential direction.

Of course, there is a positive engagement in the rotation direction due the protrusion bearing against the stop, but no positive engagement against the rotation direction is yet present. To produce a rotational connection that is essentially free of play between the drive shaft and the output shaft, a depression which can correspond to the protrusion without play is preferably arranged in the window. The protrusion can then, once the positively engaged connection has been produced by bearing against the stop, be inserted into the depression by a further movement in an axial direction, in order to produce a connection without play. Since there is no longer any relative speed between the first element and second element in a circumferential direction when the protrusion bears against the stop, an insertion into the depression, which is smaller than the window, is then easily possible. The first element can, for example, be formed such that it is axially displaceable and rotationally fixed with the output shaft or the drive shaft, and the second element can be connected to a toothed wheel of a gear or be formed by a toothed wheel, in order to produce a rotational coupling between the drive shaft and output shaft via one of the gears through the insertion of the protrusion into the window. Of course, the first element that comprises the window can also be connected to a toothed wheel or be formed by the toothed wheel, and the second element can be connected in a rotationally fixed manner to the drive shaft or output shaft.

Typically, sensors are provided with which rotational speeds of the drive shaft and the output shaft can be measured, in order to enable an exact adjustment of the electric motor to the second speed.

If, for example, the first gear has a transmission ratio of 4, so that an input rotational speed of the electric motor of, for example, 4000 revolutions per minute, or rpm, is translated to an output rotational speed of 1000 rpm at the transmission output, and the second gear has a transmission ratio of 2, so that an input rotational speed of the electric motor of 4000 rpm is translated to an output rotational speed of 2000 rpm at the transmission output, the electric motor, for a most gentle, and therefore comfortable, possible shifting of the gears during the shifting process, must be decelerated to a rotational speed that corresponds to the quotient of the second transmission ratio and first transmission ratio, that is, the quotient of 2 and 4, and therefore 0.5. Thus, if the rotational speed of the electric motor at the start of the shifting process is 1000 revolutions per minute, this must be decelerated to 500 revolutions per minute by the electric synchronizing device during the shifting process, in order to ensure a constant rotational speed of 250 rpm of the output shaft during the shifting process. Of course, these rotational speeds are to be understood as being exemplary and, in a drive according to the invention, a synchronizing rotational speed is typically dependent in particular on a motor used, a shifting time, and an application of the drive, for example in an electric vehicle. For example, the output shaft can be connected to wheels of a motor vehicle, in order to propel said vehicle. With an inverter that is connected to a correspondingly sized storage battery, for example, this electric synchronization is easily feasible without wear elements. Of course, the transmission ratios of the individual gears can be any desired positive or negative values that can be greater or less than 1.0, so that both accelerating transmission ratios and also decelerating transmission ratios are thus possible with a drive according to the invention.

It is beneficial if the drive is designed to carry out a shifting process in which the duration of the shifting process is less than one second, in particular less than 150 milliseconds. This ensures a particularly rapid changing of the gears, or a changing of a transmission ratio of a rotational speed of the electric motor to an output rotational speed at the transmission outlet, which can be connected to wheels of an electric vehicle, for example. For it to be possible to ensure correspondingly short shifting processes, it is beneficial if the electric motor is designed with a low moment of inertia of the moving masses or of the anchor, and/or if the electric synchronizing device is designed to absorb or deliver large amounts of power. This can be achieved, for example, through an electric device such as an inverter that is suitable for correspondingly large currents or amounts of power. It is furthermore advantageous if an electrical energy storage device is provided that is configured both to absorb and also deliver large amounts of electrical power. It is beneficial if a storage battery is connected to the electric motor, in which storage battery electric energy that is created in the electric motor during a deceleration process can be stored. Of course, it is also alternatively or additionally possible to partially or fully convert electric energy created in the electric motor during a deceleration process into heat instead of storing it. For this purpose, a heating resistor and/or an electrically powered flywheel can be provided, for example.

Typically, a storage battery is connected to the electric motor via an inverter, so that on the one hand the electric motor can be powered by the storage battery and on the other hand an electric energy generatively created in the electric motor during a deceleration of the electric motor can be stored in the storage battery via the inverter. Of course, the electric motor can also be designed as a direct current motor, so that an inverter is not necessary.

It is beneficial if at least one coupling element is provided that is connected to the drive shaft or the output shaft in positive engagement in a first direction, in particular in a circumferential direction, and movably in a second direction, in particular in an axial direction, in order to releasably connect at least one gear to the drive shaft or the output shaft. Of course, the designations "circumferential direction" and "axial direction" are to thereby be respectively understood in relation to the shaft, that is the drive shaft or the output shaft, to which the coupling element is connected. For example, the coupling element can be designed as a sleeve that can be axially displaced on the output shaft, which sleeve is connected in a rotationally fixed manner to the output shaft and is suitable for producing a positively engaged, rotationally fixed connection of the output shaft to a toothed wheel of a gear by axial displacement of the sleeve.

The individual gears, which can be formed, for example, by toothed gear pairs having different transmission ratios, cannot be simultaneously connected to the drive shaft and the output shaft, since this would lead to a kinematic overdeterminacy. Therefore, only one gear can be maximally engaged at a time, by which gear a transmission ratio of the drive shaft to the output shaft is defined. All other gears must then be disconnected kinematically from the drive shaft and/or the output shaft, so that a rotational movement of the drive shaft is only translated into a rotational movement of the output shaft via one gear. The individual gears must thus be releasably connected to the drive shaft and/or the output shaft, wherein it must be possible to release and produce a kinematic connection during a shifting process. A corresponding connection can, for example, be produced using a coupling element that can be connected to the drive shaft or the output shaft in a non-positively or positively engaged manner in a circumferential direction, that is, rotationally fixed, so that the coupling element co-rotates with the drive shaft or the output shaft and is axially displaceable on the drive shaft or the output shaft for the purpose of producing or releasing a connection of the drive shaft or the output shaft to a toothed wheel of the respective gear, in order to also produce a positive engagement in a circumferential direction with the respective toothed wheel starting at a predefined axial position, so that the toothed wheel is connected to the drive shaft or the output shaft in positive engagement, that is, in a rotationally fixed manner, in a circumferential direction via the coupling element. A gear can thus be connected to the drive shaft or the output shaft in a simple and simultaneously rapid manner by an axial movement of the coupling element on the drive shaft or the output shaft. A connection can be released simply in a similar manner.

In principle, the coupling element can interact in different ways with a gear, or a toothed wheel of a gear, which is to be connected to the drive shaft or the output shaft via the coupling element, for example in frictional engagement or magnetically, in order to produce a rotationally fixed connection. An especially simple construction results in particular if at least one coupling element can be releasably connected to at least one gear in positive engagement. Large torques can thus also be transmitted in a reliable manner and without slip.

Preferably, the coupling element is also connected to the drive shaft or the output shaft in positive engagement in a circumferential direction, in particular via an inner toothing or a splined shaft. A positive engagement in a circumferential direction with the toothed wheel of the gear which is to be connected to the drive shaft or the output shaft via the coupling element can likewise occur via a toothing, a dog, or the like.

To achieve a particularly simple construction, it is beneficial if the coupling element can be connected to the first gear on a first side, in particular a face, and to the second gear on a second side, in particular a face opposite of the first side. A single coupling element is then sufficient to optionally engage one of two gears or to produce a coupling of one of the two gears to the drive shaft or the output shaft. The coupling element can then, for example, be arranged on the output shaft between toothed wheels of the first gear and toothed wheels of the second gear, in order to connect the first gear or the second gear to the output shaft depending on an axial position of the coupling element on the output shaft. Analogously, a corresponding arrangement on the drive shaft would also be possible.

According to the invention, it is provided that the drive shaft can be releasably coupled to the output shaft via a gear by means of at least one dog that engages in a depression. Via the dog, a releasable, positively engaged connection for transmitting a torque can thus be produced in a simple manner. By moving the dog out of the depression, the positive engagement is released in a simple manner, so that the drive shaft is no longer connected to the output shaft via the corresponding gear.

The advantages of a drive according to the invention can be realized in a particularly advantageous manner if said drive is used in a vehicle, in particular an electric vehicle, in order to propel or brake the vehicle. Thus, in an electric vehicle with a drive, in particular in an electric car, an electric boat, or an electric motorcycle, it is advantageous if the drive is designed according to the invention. Of course, electric vehicles in this case include both vehicles that are solely electrically powered as well as what are referred to as hybrid vehicles, in which an internal combustion engine can also be provided in addition to an electric motor.

It is beneficial if the dog and the depression are designed such that the dog has a play of less than 20 mm, in particular less than 10 mm, preferably less than 5 mm, relative to the depression when the drive shaft is coupled to the output shaft. As a result, the dog can also be easily introduced into the depression, for example, if the dog or the depression comprise an undercut in order to prevent in a simple manner an inadvertent removal of the dog from the depression. A play can, for example, thereby permit a rotation of a component part comprising the dog relative to a component part comprising the depression of less than 5°, in particular less than 2°.

In order to achieve a high degree of comfort, for example when the transmission is used in a motor vehicle, it is beneficial if the dog can be positioned in the depression with essentially no play. Noises or vibrations in the transmission that have unpleasant effects are thus prevented. The dog can also comprise an undercut, so that an inadvertent removal of the dog from the depression is avoided in a simple manner.

According to the invention, it is provided that the depression is arranged in a window which extends along a direction along which an element coupled to the drive shaft can be moved relative to an element coupled to the output shaft when the output shaft is no longer coupled to the drive shaft during a shifting process, so that the dog can be moved into the depression through the window from an uncoupled state. Typically, the window is arranged in a face area of the coupling element, which face area of the coupling element is moved over the dog during a coupling process to a toothed wheel so that the dog can engage in the depression arranged in the window in the face area. The window thus has, proceeding from the face, a smaller depth than the depression, but a larger extension in a circumferential direction than the depression, so that by means of the window, the dog is, in a manner of speaking, caught by the window even with a relative movement between the dog and the depression and, via a positive engagement in a circumferential direction, can be synchronized in terms of a circumferential speed with the window, or a component part comprising the window can be synchronized with a component part comprising the dog. Thus, a toothed wheel comprising one or more dogs, for example, can be synchronized in a simple manner with a coupling device formed by a dog plate that comprises depressions which correspond to the dogs and are arranged in windows, in order to produce a rotationally fixed connection between the coupling device and the toothed wheel.

The term "window" is in this case broadly interpreted and defines a region which comprises a base that, at least partially, preferably completely, lies between a portion of the face area of the coupling element, in particular between a plane of the face area, and an engagement plane, in which engagement plane an axial end of the dog is located when the dog is located in the depression and the drive shaft is coupled to the output shaft. Furthermore, the window normally has in a circumferential direction an extension greater than the depression, and an extension of the window in a radial direction corresponds to at least an extension of the depression in a radial direction, so that, proceeding from the face area, the dog can be completely moved into the window by a movement in an axial direction, after which the dog can slide in the window along the base of the window up to the depression, whereupon the dog can be inserted into the depression by a further movement in an axial direction. Consequently, it is irrelevant whether a radial extension of the window is exactly equivalent to a radial extension of the dog or is greater. In particular, it can be provided that a radial extension of the window extends, for example, over an entire radial extension of the face or of the coupling element, that is, from an inner diameter of the coupling element up to an outer diameter. The term "window" is consequently synonymous with one of the terms "recess in the face" or "pre-depression".

Furthermore, it can be provided that the base of the window forms an intermediate plane which is located at least partially between the face and an engagement plane.

As a result, the window with the depression arranged therein has the effect of producing a synchronization in a particularly simple constructional manner by means of the dog, in that the dog is first moved in an axial direction and thereby inserted into the window, which is larger than the dog, after which the dog bears against an end of the window so that a positive engagement between the dog and window occurs in a circumferential direction and, because of this positive engagement, a synchronization of the speed of the dog and the speed of the window occurs, whereupon the dog is positioned in the depression by further movement in an axial direction, so that the dog is connected to the depression in an essentially positive engagement in a circumferential direction, where necessary with a minor amount of play.

In this manner, a reliable engagement is possible even at high rotational speeds, in that the dog is first axially inserted into the window, which has a greater extension than the depression so that an advancement of the dog into the window is possible, or the dog can be caught by the window, even at a comparatively high rotational speed differential. When the dog is located in the region of the window, a relative movement between the dog and the coupling device is only possible up until the dog bears against a border of the window or is once again removed from the window. When the dog bears against a border or stop of the window, the dog is carried along on the stop or an end of the window in a circumferential direction, so that a speed of the dog corresponds to a speed of the window or the depression. In other words, a shifting process is thus also possible when the toothed wheel and the coupling element or the shaft, that is, typically the drive shaft or the output shaft, to which the corresponding toothed wheel is to be connected, have different speeds, especially since a synchronization to exactly the same angular velocity occurs in this case via a positive engagement or a carrying-along of the dog due to the stop of the window. The dog can, in a simple manner, subsequently be inserted into the depression, which is preferably located at the end of the window at which the stop with which the dog can be carried along is also located. It can also be provided that, during a shifting process, the electric motor is brought by the electric synchronizing device to a slightly faster or slower rotational speed than that which corresponds to the initial rotational speed at the start of the shifting process multiplied by the quotient of the second transmission ratio and first transmission ratio, in order to enable a reliable shifting and secure insertion of the dog into the depression via a slight relative rotation, especially since it would never be possible to insert the dog into the depression at an exactly equal angular velocity in the case of even a slight offset.

If the dog is arranged on a toothed wheel of a gear and the depression is arranged in the coupling element, for example on a face of the coupling element, the window is thus likewise located on the face of the coupling element. The window has, proceeding from the face, a smaller depth than the depression, so that the dog is initially inserted up to a base of the window and subsequently into the depression when the dog is moved towards the toothed wheel in an axial direction in order to connect the toothed wheel to the drive shaft or the drive shaft via the coupling element.

Typically, the depression is arranged at an end in the window, in particular at a circumferential end of the window, in order to obtain a reliable connection between the dog and the depression.

Even though the individual gears can be formed by various different elements, for example friction wheels or connecting rods, it has proven particularly effective that the first gear be formed by a first toothed wheel pairing and the second gear be formed by a second toothed wheel pairing. Low wear and a long service live can thus be achieved even at high rotational speeds.

It is preferably provided that the toothed wheel pairings are connected to the drive shaft in a rotationally fixed manner and can be connected to the output shaft via at least one coupling element designed as a dog plate, wherein the dog plate is connected to the output shaft in positive engagement in a circumferential direction and can be displaced relative to the output shaft in an axial direction. Via an axial movement of the dog plate, a gear or a toothed wheel pairing can then be connected to the output shaft or released from the drive shaft. Of course, one or more dog plates can also be provided alternatively or additionally for the releasable coupling of one or more toothed wheel pairings to the drive shaft.

It has proven effective that the output-side toothed wheels of the toothed wheel pairings respectively comprise at least one dog, preferably two to seven, in particular three to five dogs which extend in an axial direction and correspond to depressions in a face of the dog plate. On the one hand, a torque being transmitted is thus distributed to multiple contact surfaces, so that mechanical stresses that occur are reduced. At the same time, with a corresponding quantity it is also ensured that all plates are in contact and forces are transmitted evenly.

To ensure a reliable engagement, it is beneficial if each of the depressions in the dog plate that correspond to the dogs is arranged in a window that runs along a circumferential direction, wherein the depression is arranged at an end in the window in a circumferential direction. Thus, for coupling the drive shaft to the output shaft via a gear, a two-stage engagement process is enabled in which the dog can first be inserted into the window even in the case of a rotational speed differential between the toothed wheel and the dog plate, in which window the dog is brought to a speed corresponding to the speed of the window by bearing against a stop, after which the dog can be inserted into the depression arranged in the window in a simple manner. Without such a window, an insertion of the dog into the depression, which preferably has essentially the dimensions of the dog, at a relative speed between the depression and dog would be virtually impossible, or only possible with a very high axial force between the dog plate and the dog, which force would in turn lead to increased wear.

It is beneficial if the window comprises at the end opposite of the depression a ramp that preferably extends up to the face. It can thus be prevented in a simple manner that the dog is inserted into a window of an incorrect toothed wheel in the event of a software error. In this case, the dog instead slides back out of the window again onto the face via the ramp. The ramp typically has an angle of 10° to 80°, in particular 20° to 60°, preferably 30° to 50°, in relation to a plane parallel to the face. Alternatively, a safeguard can also occur in the software so that no ramp is necessary in order to prevent an insertion of a dog, which can be arranged both on the toothed wheel and also on the coupling element, into an incorrect window, in which window the depression is arranged and which window can likewise be arranged both on the coupling element and also in the toothed wheel.

The ramp typically connects a base of the window to the face, so that the dog can slide from the face to the base of the window with continuous contact via the ramp.

It is preferably provided that the ramp comprises a surface that is arranged at an angle relative to a base of the window and connects the base of the window to the face. The base of the window is preferably roughly parallel to the face. Consequently, the angle at which the ramp is arranged relative to the face also normally corresponds to the angle at which the ramp is arranged relative to the base. The angle is preferably 10° to 80°, in particular 20° to 60°, preferably 30° to 50°.

It is beneficial if the at least one dog comprises a chamfer on an edge, wherein an angle of the chamfer corresponds to an angle of the ramp, so that the dog can slide from the face area into the window via the ramp by means of a planar contact between the chamfer and the ramp.

It has proven effective that the at least one dog comprises a cap surface, wherein an orientation of the cap surface corresponds to an orientation of a base of the window, so that the dog can slide from the ramp into the depression via the base by means of a planar contact between the cap surface and the base.

In place of the ramp, a stop at the circumferential end of the window can also be provided in order to recover energy via a positive engagement between the dog and the window in the event of an unusual driving situation. In this case, energy can also be transferred via a partial engagement of the dog, which in this case is not engaged in the depression, but is engaged in the window.

The dog plate is typically arranged in the transmission such that it can be displaced in an axial direction via a spring by means of an actuator such as a linear motor. Normally, the dog plate is actuated via a shift fork which is guided in an external groove in the dog plate, wherein the shift fork can be actuatable in the transmission, which is typically designed as an automatic transmission, via a spring by means of an actuator, in order to displace the dog plate along an axial direction of the output shaft, or parallel to a rotation axis of the output shaft, so that different gears can be coupled to the output shaft.

The other object is attained according to the invention by a coupling element of the type named at the outset in which at least one window which extends over a portion of a circumference of the coupling element is provided on a face, wherein at a circumferential end of the window a depression is arranged in which a dog that corresponds to the depression can engage. The depression is larger in a circumferential direction than the dog, so that a dog, which can be coupled to the depression with roughly no play, can, in a manner of speaking, be caught by the window in the case of a relative movement between the dog and the depression in a circumferential direction, in order to insert the dog into the depression located in the window. Thus, from the face area or a face of the coupling element, the depression has a greater depth than the window.

A corresponding coupling element is designed for a two-stage coupling process in which a coupling process is also possible at relative speeds between a toothed wheel, which comprises a dog for the depression, and the coupling element, in that the dog first advances into the window, and is then brought to the speed of the coupling element in the window by bearing against an end of the window, after which the dog can advance into the depression. Typically, a coupling element of this type is used in a drive according to the invention.

It is preferably provided that the coupling element is designed as a dog plate, which in particular is roughly symmetric in relation to a central plane. The dog plate can then be arranged between two gears, or between two toothed wheel pairings that respectively form gears, on an output shaft, in order to optionally connect one of the two gears to the output plate by an axial displacement of the dog plate, in that dogs on the toothed wheels of the gears are inserted into the depressions. The central plane is then perpendicular to a rotation axis about which the dog plate is rotatably arranged in the transmission, or to a rotation axis of the output shaft. Faces of the dog plate are then typically parallel to the central plane. It can also be provided that the windows are arranged on the two faces such that a depression extends through the dog plate and is accessible from both faces and is simultaneously arranged in windows on both faces. A particularly thin dog plate, and therefore a transmission with a small space requirement, is thus possible.

In order to be able to connect the coupling element to a drive shaft or an output shaft in a simple manner, it is beneficial if the coupling element comprises an inner toothing for a positively engaged coupling to an output shaft. The coupling element can then be connected to the output shaft in positive engagement in a circumferential direction in a simple manner, so that a rotational movement of the output shaft can be transmitted to the coupling element without slip. At the same time, the coupling element can be displaced along an axial direction if the coupling element is arranged in positive engagement in a circumferential direction on the output shaft, in order to be able to connect different toothed wheels to the output shaft via the coupling element. Of course, the output shaft can then typically comprise an appropriate outer toothing for a positive engagement, wherein the individual teeth are arranged in an axially parallel manner or are designed to be straight-cut.

The coupling element, which is preferably designed as a dog plate, can typically be positioned rotatably about a rotation axis or an axial direction and can comprise a groove on the outer circumference rotationally symmetrical to the rotation axis, which groove can serve as a guide for a shift fork in order to displace the coupling element axially along the axial direction.

It is beneficial if the coupling element can be actuated via a spring. A displacement of the coupling element via a spring along the axial direction has proven effective for bringing the coupling element into positively engaged connection to a dog of the toothed wheel in a simple manner. An axial force is thus applied via the spring, which force presses a face of the coupling element against a dog on a toothed wheel. If a relative movement between the toothed wheel and coupling element causes a window of the coupling element to be located in the region of the dog, an axial movement of the dog into the depression of the dog plate is effected by the axial force applied via the spring. Lower wear with a simultaneously rapid shifting time is thus ensured.

The other object is attained according to the invention by a method of the type named at the outset with which a drive according to the invention is operated, in which drive a rotational speed of the electric motor is changed to roughly a second rotational speed by means of an electric synchronizing device for a duration of the shifting process in that the electric motor is accelerated or braked, wherein the second rotational speed corresponds to the first rotational speed multiplied by the quotient of the second transmission ratio and first transmission ratio, after which the drive shaft is rotationally coupled to the output shaft by means of a positive engagement.

Thus, according to the invention, a mechanical synchronization, which is typically accompanied by a conversion of kinetic energy into heat, is essentially replaced by an electric synchronization, which is easily feasible in electric motors. The method can thus be implemented with little friction, and therefore more efficiently, and at the same time with a simpler drive. Because of the coupling by means of a positive engagement, which preferably occurs by an insertion of one or more protrusions into one or more windows, a particularly rapid and low-friction change of gear is possible, so that a drive with a high degree of comfort and imperceptible traction force disruptions is possible, which is in particular advantageous in an application in an electric vehicle.

It is beneficial if an energy for accelerating the electric motor is drawn from a storage battery. The electric motor can be designed both as a direct current motor and also as an alternating current motor, synchronous motor, or asynchronous motor. The method can thus be easily implemented in a vehicle with a drive, wherein the storage battery is moved with the vehicle by the drive.

It is beneficial if, during deceleration, kinetic energy is converted into electric energy and at least partially stored in a storage battery. Typically, the storage battery in which the electric energy generatively created during deceleration is stored is identical to the indicated storage battery from which energy is drawn for accelerating the electric during downshifting.

In addition, the invention comprises the following points:

Point 1. A drive with an electric motor and a transmission to which the electric motor is connected at a drive shaft, in particular for an electric vehicle, wherein the transmission comprises at least two gears with different transmission ratios, via which an output shaft can be alternately coupled to the drive shaft in order to achieve different transmission ratios of a rotational speed of the drive shaft to a rotational speed of the output shaft, wherein the transmission is designed to carry out a shifting process in which a coupling of the drive shaft, driven by the electric motor rotating at a first rotational speed, to the output shaft via a first gear with a first transmission ratio is first released, so that the drive shaft is no longer rotationally coupled to the output shaft, after which the drive shaft is rotationally coupled to the output shaft via a second gear with a second transmission ratio, characterized in that an electric synchronizing device is provided with which a rotational speed of the electric motor can be changed to a second rotational speed for a duration of the shifting process, wherein the second rotational speed corresponds to the first rotational speed multiplied by a quotient of the second transmission ratio and first transmission ratio, wherein the drive is designed to produce a releasable rotational coupling between the drive shaft and the output shaft via the second gear by means of a positive engagement.

Point 2. The drive according to point 1, characterized in that, for the purpose of producing a releasable rotational, positively engaged connection between the drive shaft and the output shaft, the drive comprises a rotatable first element with a window in which a stop is arranged and a rotatable second element with a protrusion, in particular a dog, that can be inserted into the window, wherein a rotational movement can be transmitted from the second element to the first element in positive engagement by means of the protrusion.

Point 3. The drive according to point 1 or 2, characterized in that the drive is designed to carry out a shifting process in which the duration of the shifting process is less than one second, in particular less than 150 ms.

Point 4. The drive according to one of points 1 through 3, characterized in that a storage battery is connected to the electric motor, in which storage battery electric energy that is created in the electric motor during a deceleration process can be stored.

Point 5. The drive according to one of points 1 through 4, characterized in that at least one coupling element is provided that is connected to the drive shaft or the output shaft in positive engagement in a first direction, in particular in a circumferential direction, and movably in a second direction, in particular in an axial direction, in order to releasably connect at least one gear to the drive shaft or the output shaft.

Point 6. The drive according to point 5, characterized in that the at least one coupling element can be releasably connected to at least one gear in positive engagement.

Point 7. The drive according to point 6, characterized in that the coupling element can be connected to the first gear on a first side and to the second gear on a second side.

Point 8. The drive according to one of points 1 through 7, characterized in that the drive shaft can be releasably coupled to the output shaft via a gear by means of at least one dog that engages in a depression.

Point 9. The drive according to point 8, characterized in that the dog can be positioned in the depression with essentially no play.

Point 10. The drive according to one of points 8 or 9, characterized in that the depression is arranged in a window which extends along a direction along which an element coupled to the drive shaft can be moved relative to an element coupled to the output shaft when the output shaft is not coupled to the drive shaft during a shifting process, so that the dog can be moved into the depression through the window from an uncoupled state.

Point 11. The drive according to point 10, characterized in that the depression is arranged at an end on the window.

Point 12. The drive according to one of points 1 through 11, characterized in that the first gear is formed by a first toothed wheel pairing and the second gear is formed by a second toothed wheel pairing.

Point 13. The drive according to point 12, characterized in that the toothed wheel pairings are connected to the drive shaft in a rotationally fixed manner and can be connected to the output shaft via at least one coupling element designed as a dog plate, wherein the dog plate is connected to the output shaft in positive engagement in a circumferential direction and can be displaced relative to the output shaft in an axial direction.

Point 14. The drive according to point 13, characterized in that the output-side toothed wheels of the toothed wheel pairings respectively comprise at least one dog, preferably two to seven, in particular three to five dogs which extend in an axial direction and correspond to depressions in a face of the dog plate.

Point 15. The drive according to point 13 or 14, characterized in that each of the depressions in the dog plate that correspond to the dogs is arranged in a window that runs along a circumferential direction, wherein the depression is arranged at an end in the window in a circumferential direction.

Point 16. The drive according to point 15, characterized in that the window comprises a ramp at the end opposite of the depression.

Point 17. The drive according to one of points 13 through 16, characterized in that the depressions comprise an undercut.

Point 18. The drive according to one of points 1 through 17, characterized in that, for coupling the drive shaft to the output shaft via at least one gear, a coupling element according to one of points 20 through 23 is provided and is movably arranged in the transmission, in particular such that it is connected to the drive shaft or output shaft in a rotationally fixed manner and can be displaced along an axial direction.

Point 19. An electric vehicle with a drive, characterized in that the drive is designed according to one of points 1 through 18.

Point 20. A coupling element for a drive according to one of points 1 through 18, characterized in that at least one window which extends over a portion of a circumference of the coupling element is provided on a face, wherein at a circumferential end of the window a depression is arranged in which a dog that corresponds to the depression can engage.

Point 21. The coupling element according to point 20, characterized in that the coupling element is designed as a dog plate, which in particular is roughly symmetric in relation to a central plane.

Point 22. The coupling element according to point 20 or 21, characterized in that the coupling element comprises an inner toothing for a positively engaged coupling to an output shaft.

Point 23. The coupling element according to one of points 20 through 22, characterized in that the coupling element can be actuated via a spring.

Point 24. A method for operating a drive, in particular a drive according to one of points 1 through 18, that comprises an electric motor and a transmission connected to the electric motor, wherein the transmission comprises at least two gears with different transmission ratios, via which an output shaft can be coupled to a drive shaft in order to achieve different transmission ratios of a rotational speed of the drive shaft to a rotational speed of the output shaft, wherein a shifting process occurs in that a rotational coupling of the drive shaft, driven by the electric motor rotating at a first rotational speed, to the output shaft via a first gear with a first transmission ratio is first released, so that the drive shaft is no longer rotationally coupled to the output shaft, after which the drive shaft is rotationally coupled to the output shaft via a second gear with a second transmission ratio, characterized in that a rotational speed of the electric motor is changed to roughly a second rotational speed by means of an electric synchronizing device for a duration of the shifting process in that the electric motor is accelerated or braked, wherein the second rotational speed corresponds to the first rotational speed multiplied by the quotient of the second transmission ratio and first transmission ratio, after which the drive shaft is rotationally coupled to the output shaft by means of positive engagement.

Point 25. The method according to point 24, characterized in that an energy for accelerating the electric motor is drawn from a storage battery.

Point 26. The method according to point 24, characterized in that, during deceleration, kinetic energy is converted into electric energy and at least partially stored in a storage battery.

Additional features, advantages, and effects of the invention follow from the exemplary embodiment described below. In the drawings which are thereby referenced:

DETAILED DESCRIPTION

Figure 1:
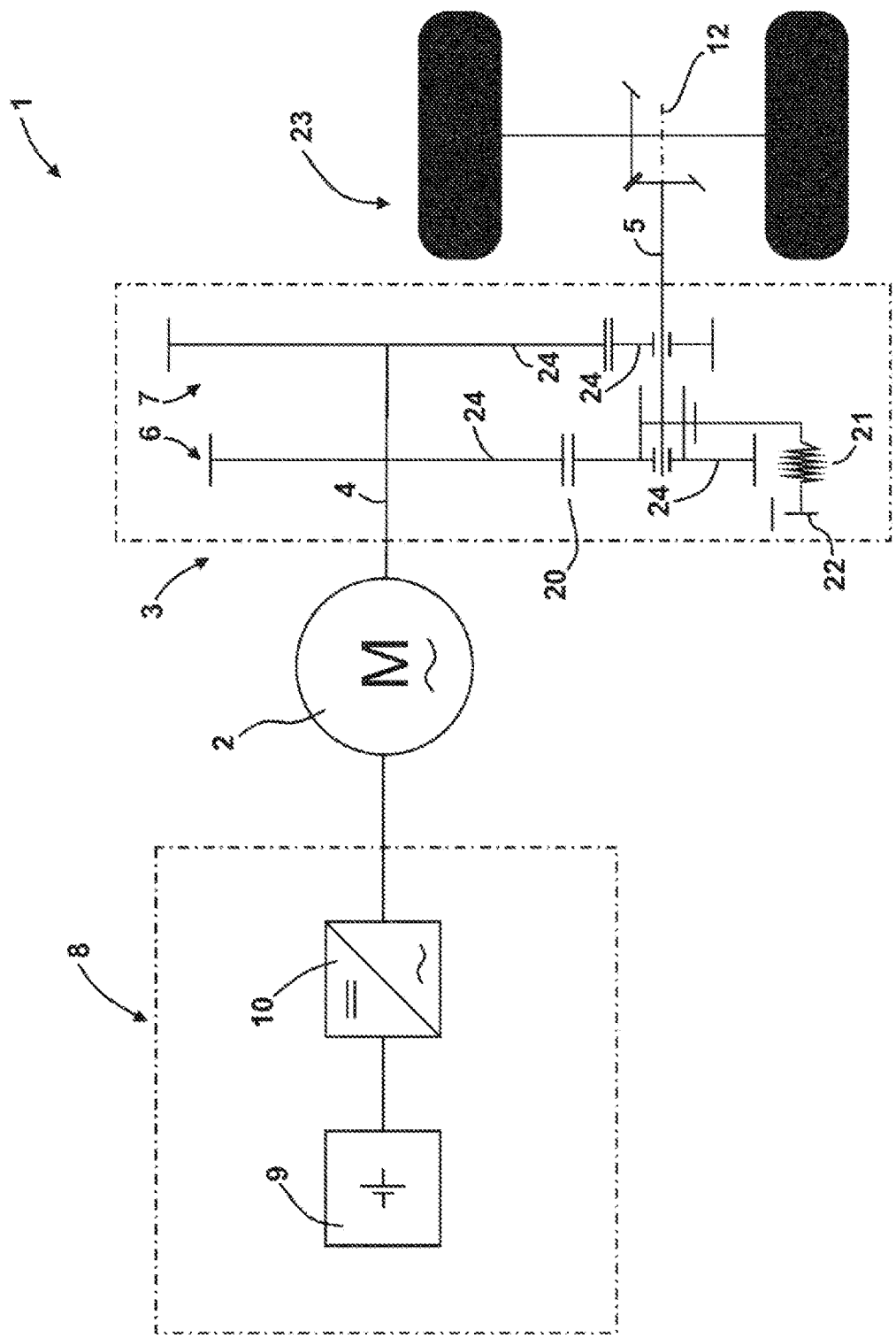
FIGS. 1 through 3 show a drive according to the invention in schematic illustration.
Figure 2:
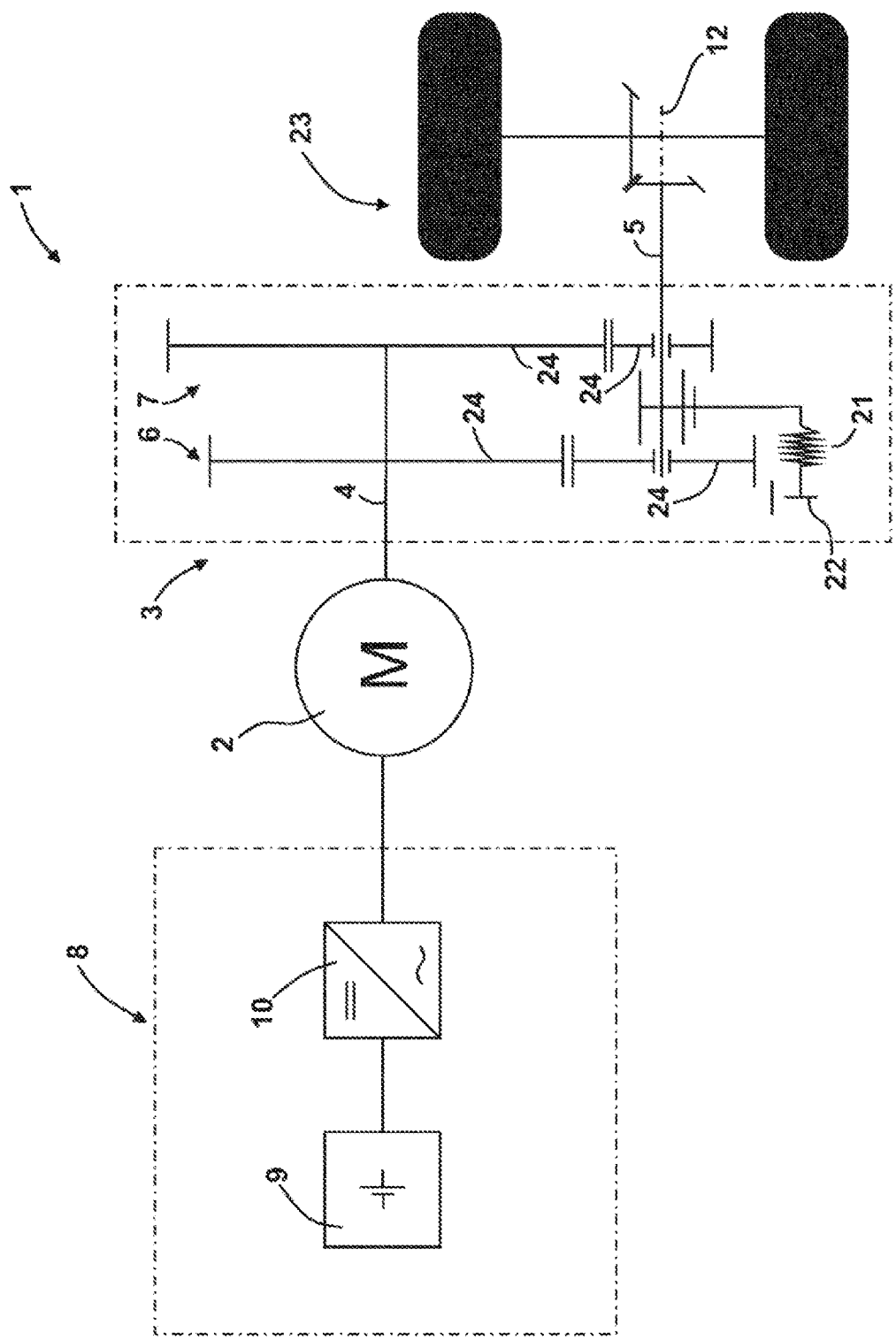
Figure 3:
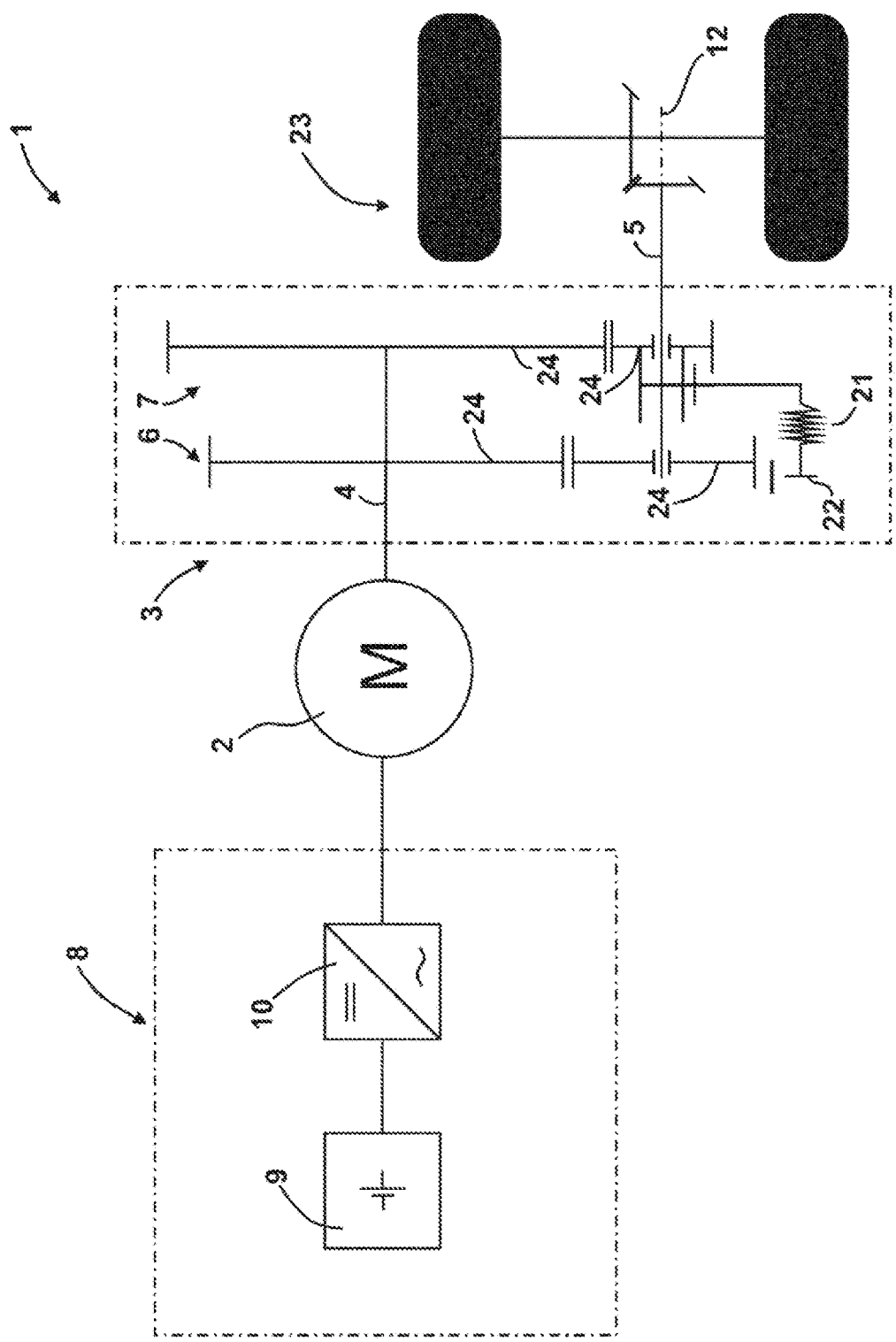

FIGS. 1 through 3 show in schematic illustration a drive 1 according to the invention in different working states. As can be seen, the drive 1 comprises an electric motor 2, embodied by way of example as a synchronous motor, that acts on a drive shaft 4 of a transmission 3. In the exemplary embodiment illustrated, the transmission 3 comprises two gears 6, 7 with different transmission ratios, which are formed by two toothed wheel pairs, wherein one toothed wheel 24 of each toothed wheel pairing is respectively connected to the drive shaft 4 in a rotationally fixed manner. A first toothed wheel pair thereby forms a first gear 6, which has a transmission ratio of a rotational speed of the drive shaft 4 to a rotational speed of the output shaft 5 of approximately 0.5. A second gear 7 is formed by a second toothed wheel pair in which the transmission ratio is approximately 0.2. In other words, when the second gear 7 is engaged, the output shaft 5 rotates roughly five times about its axis, whereas in the same amount of time, the drive shaft 4 rotates only a single time about its axis, so that the electric motor 2 rotates more slowly than the output shaft 5. Of course, the transmission 3 can be practically realized with any desired transmission ratios that can be greater or less than 1, so that these can be both transmission ratios and also reduction ratios, or a decelerating transmission ratio.

To prevent kinematic overdeterminacy, only one of the two gears 6, 7 can also be maximally coupled to the output shaft 5, and a change in gear occurs by disengaging one gear and engaging the other gear. Constructionally, this is achieved in that the output-side toothed wheels 24 of the toothed wheel pairs can be releasably connected to the output shaft 5 in a rotationally fixed manner, namely via a coupling element which can be displaced on the output shaft 5 in an axial direction. The coupling element is connected to the output shaft 5 in a rotationally fixed manner and can be connected in positive engagement in a circumferential direction 11 to every single one of the output-side toothed wheels 24 of the toothed wheel pairings, in particular via a dog connection, so that the output-side toothed wheels 24 can be connected to the output shaft 5 in a rotationally fixed manner via the coupling element. FIG. 1 thereby shows a state in which the coupling element connects the output-side toothed wheel 24 of the first gear 6 to the output shaft 5 in a rotationally fixed manner, so that in this operating state the first gear 6 is engaged and the transmission ratio between the drive shaft 4 and output shaft 5, that is, a quotient of a rotational speed of the drive shaft 4 to a rotational speed of the output shaft 5, is approximately 0.5.

FIG. 2 shows a state of the transmission 3 during a change in gear, in which the coupling element is located axially between the two gears 6, 7, so that no gear is engaged and the drive shaft 4 is not coupled to the output shaft 5 in a circumferential direction 11.

FIG. 3 shows the transmission 3 in a state in which the second gear 7 is engaged, so that a transmission ratio of a rotational speed of the drive shaft 4 to a rotational speed of the output shaft 5 is approximately 0.2.

The illustrated drive 1 can, as indicated in FIGS. 1 through 3 for example, be arranged in a vehicle, so that the drive shaft 5 of the transmission 3 acts on powered wheels 23 of the vehicle in order to propel the vehicle on a road, for example. During a shifting process, which can have a duration of 150 ms for example, a rotational speed of the output shaft 5 remains essentially constant, in particular due to an inertia of the vehicle. In an upshifting process from the first gear 6 to the second gear 7, a deceleration of the drive shaft 4 is thus necessary for a comfortable shifting process in order to prevent a lurch or the like when the second gear 7 is engaged. In drives 1 from the prior art, this occurs via synchro rings or the like, that is, a mechanical acceleration or braking of the drive shaft 4, whereby kinetic energy is converted into thermal energy in the transmission 3.

In the drive 1 according to the invention, a corresponding synchronization occurs essentially electrically through an electric synchronizing device 8 that accelerates or decelerates the electric motor 2, which at the start of the shifting process as illustrated in FIG. 1 has a first rotational speed, to roughly a second rotational speed after a disengagement of the first gear 6, which second rotational speed corresponds to the first rotational speed multiplied by a quotient of the second transmission ratio and first transmission ratio. Thus, if the rotational speed of the electric motor 2 equals 1000 rpm at the start of the shifting process illustrated in FIG. 1, this is decelerated to a second rotational speed of 1000·0.2/0.5=400 rpm by the electric synchronizing device 8 during the shifting process, after disengagement of the first gear 6 and before engagement of the second gear 7, so that, with a connection of the coupling element to the output-side toothed wheel 24 of the second toothed wheel pair, there is virtually no relative speed between this toothed wheel 24 and the coupling element rotating at the angular velocity of the output shaft 5. As a result, kinetic energy must, at most, be converted into heat in a very small amount in the transmission 3, whereas the kinetic energy released during the deceleration of the electric motor 2 is predominantly or completely converted into electric energy via the electric synchronization device 8 and stored. For this purpose, the electric synchronizing device 8 comprises an inverter 10 or alternate current power controller and a storage battery 9 connected thereto, so that electric energy created during deceleration by a generative operation of the electric motor 2 can also be stored, for example to accelerate the electric motor 2 accordingly to 2.5 times the rotational speed during a subsequent shifting process from the second gear 7 to the first gear 6. The coupling element can thus be designed in a very simple manner, for example as a dog plate 13 that is made of a case-hardened steel or the like and corresponds to dogs 14 of the toothed wheels 24.

To ensure a reliable engagement of the coupling element designed as a dog plate 13 in this case with simultaneously low frictional losses, the dog plate 13 in the exemplary embodiment can be actuated via a spring 21 by means of an actuator 22, for example a linear motor. Thus, an easily definable pressure can be applied via the spring 21 to a face 25 of the toothed wheel 24 to which the dog plate 13 is to be connected, so that in a relative position of the toothed wheel 24 and dog plate 13 in which the dog 14 of the toothed wheel 24 is located in a region of a window 15 arranged in the face 25, the dog plate 13 is moved towards the toothed wheel 24 in an axial direction, so that the dog 14 is inserted into the window 15 in which a depression 16 corresponding to the dog 14 is arranged.

Of course, in place of the dogs 14 other devices, in particular one or more protrusions, can also be provided for producing a positively engaged rotational connection. Furthermore, the dogs 14 can of course also be arranged alternatively or additionally in the coupling element, and the depressions 16 interacting with the dogs 14 in the toothed wheels 24 or in elements connected to the toothed wheels 24 in a rotationally fixed manner. A rotational connection is understood to be a connection in which a rotation of the drive shaft 4 necessarily effects, in at least one rotation direction, a rotation of the output shaft 5, if necessary at a different speed.

Figure 4:
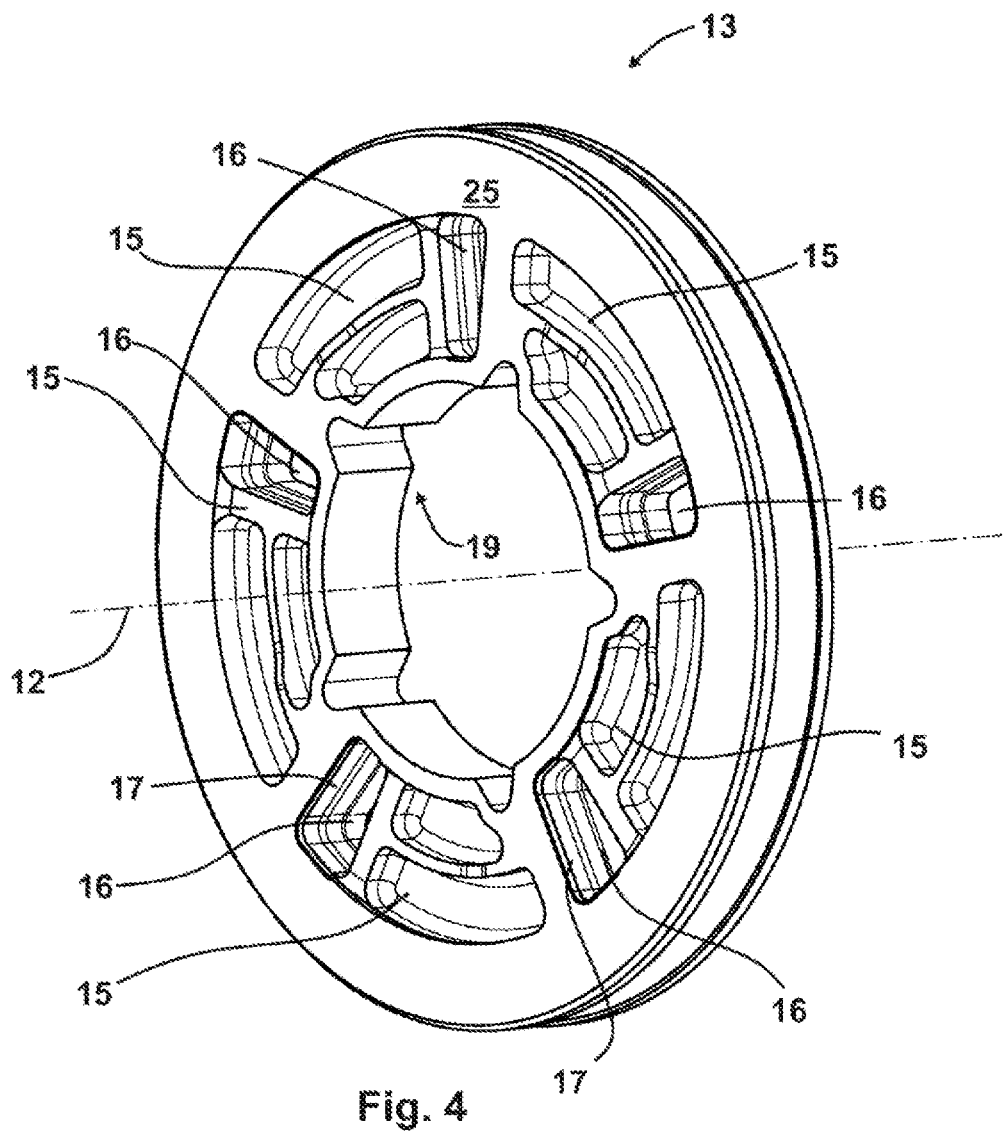
FIGS. 4 through 6 show a coupling element according to the invention in different views.
Figure 5:
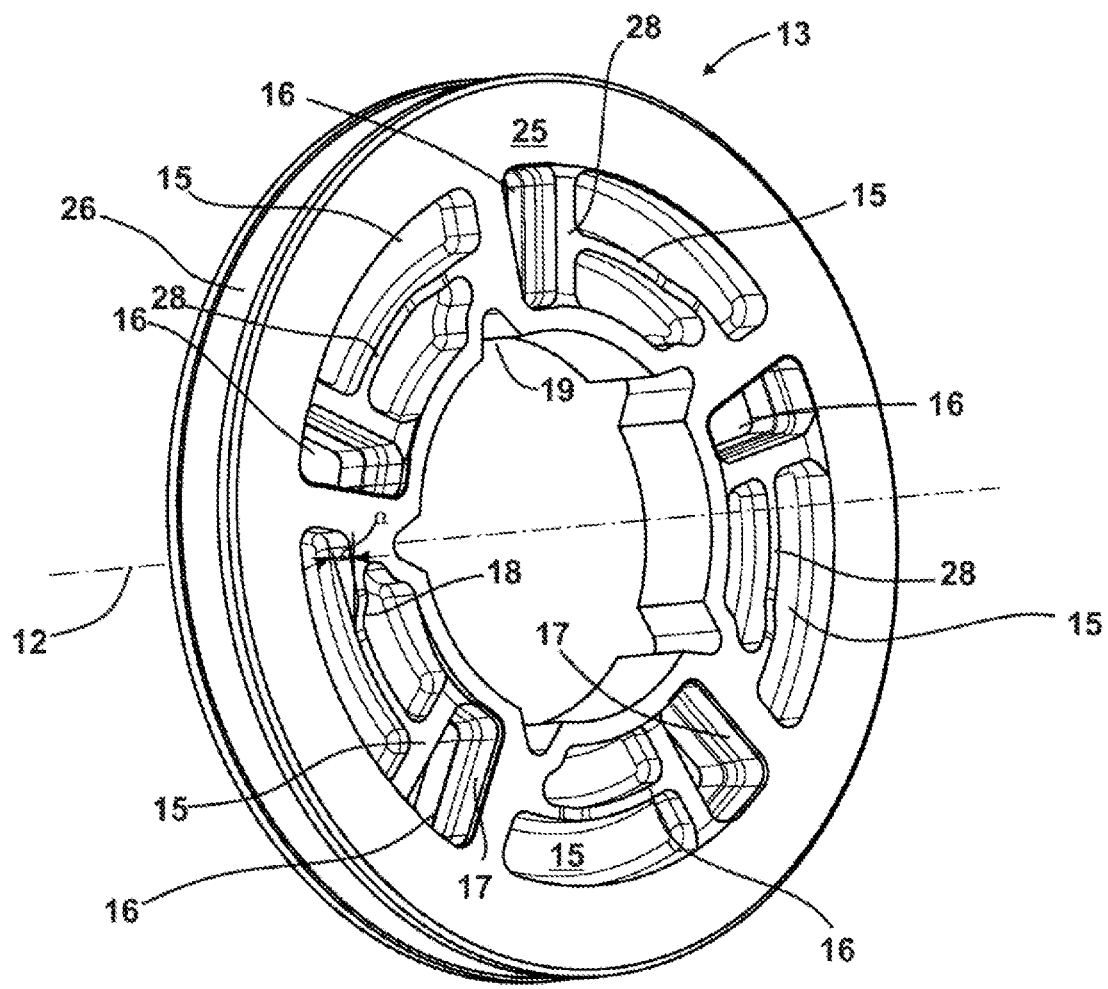
Figure 6:
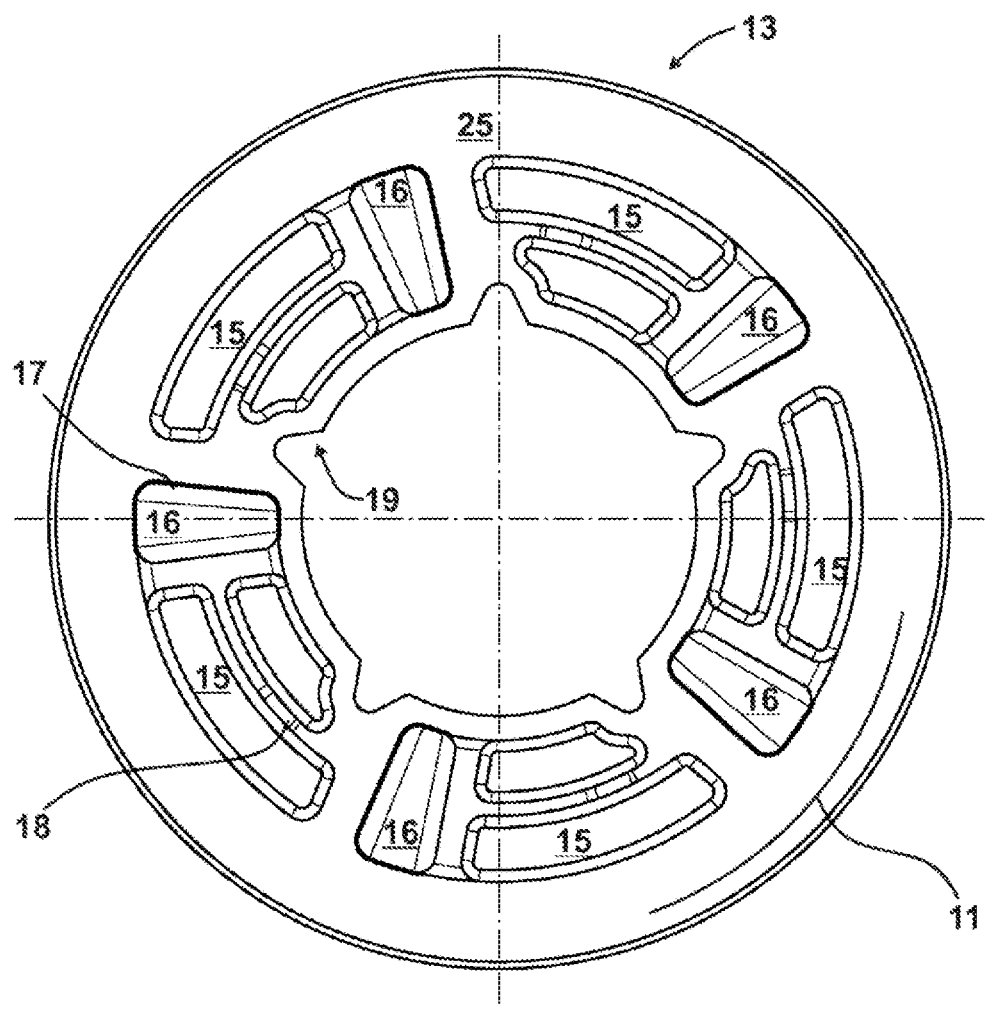

FIGS. 4 through 6 show in detail a coupling element according to the invention, designed as a dog plate 13, in different views, which coupling element can be used in the drive 1 illustrated in FIGS. 1 through 3 for example. As shown, the dog plate 13 comprises at an inner diameter an inner toothing 19 in order to be connected to the output shaft 5 in positive engagement in a circumferential direction 11. The teeth of the inner toothing 19 are aligned parallel to an axis so that the dog plate 13 can be displaced in an axial direction 12 on the output shaft 5 in order to produce a positively engaged connection between the output shaft 5 and different toothed wheels 24, arranged coaxially with the output shaft 5 along the axial direction 12 for example.

The dog plate 13 is designed in a plate shape and comprises two faces 25 which are roughly perpendicular to the axis, wherein each face 25 contains five windows 15 in which one depression 16 each is arranged at an end of the window 15 in a circumferential direction 11. The five depressions 16 correspond to five dogs 14 of the output-side toothed wheels 24, to which the dog plate 13 can be connected in the transmission 3 in order to connect the toothed wheel 24 to the dog plate 13 in positive engagement and with essentially no play.

The windows 15 thereby respectively comprise a base 28 that has a distance from the face surface, which distance is less than a maximum depth of the depressions 16 or less than a distance of a theoretical engagement plane, in which engagement plane an axial end of the dog 14 or a cap surface 29 of the dog 14 is located when the dog 14 is located in the depression 16 and the drive shaft 4 is coupled to the output shaft 5. The window 15 or the base 28 of the window 15 thus forms an intermediate plane which lies between a plane of the face 25 and the engagement plane or the depression 16, so that the dog 14 can first be inserted into the window 15 up to the base 28 by means of an axial movement, after which the dogs 14 can be inserted into the depression 16 with a further movement in the same axial direction in which the dog 14 is coupled to the depression 16 in positive engagement, normally in a rotationally fixed manner, if necessary with retention of a play. Of course, the base 28 is preferably designed to be roughly flat and, as illustrated, parallel to the face 25, but in principle can also be not flat and not parallel to the face 25. Furthermore, the base 28 can fill the entire window 15 or, as in this case, only a portion of the window 15 in order to guide the dog 14 to the depression 16, and additional notches in the window 15 can be provided next to the base 28 in order to optimize a weight.

The window 15 is designed to be larger than the depression 16 in a circumferential direction 11 and, in a radial direction, has an extension which corresponds at least to the extension of the dog 14, so that the dog 14 can be inserted into the window 15. However, the window 15 can also extend beyond that in a radial direction. In particular, the window 15 can extend across the entire coupling element or the entire face 25 in a radial direction. Therefore, in place of the term "window 15", the term "recess in the face 25" or "pre-depression", which are equivalent for the purpose of this application, may also be used.

On an outer contour of the dog plate 13, which contour is preferably roughly cylindrical with respect to the axis, a peripheral groove 26 is provided, as can be seen in FIG. 5, in which peripheral groove 26 a shift fork can engage for an axial displacement of the dog plate 13 on an output shaft 5.

The shift fork can be manually actuatable or, for the formation of an automatic transmission, connected to an actuator 22 directly or via a spring 21.

The windows 15 are used to easily enable an engagement or the production of a positively engaged connection between the dog plate 13 and the toothed wheel 24 even if the toothed wheel 24 has a different speed than the dog plate 13. Thus, in a coupling process, an axial force is applied to the dog plate 13 in the direction of the toothed wheel 24, typically via a spring 21. Through a control of the electric motor 2, it is furthermore ensured that a speed of the dog plate 13 relative to the speed of the toothed wheel 24 is calculated such that when the dogs 14 are located in the windows 15, the dogs 14 are moved to the stop 17 at the end of the window 15, at which end the depressions 16 are also located, so that through an additional axial force, which is typically applied via a spring 21 as illustrated in FIGS. 1 through 3, the depressions 16 are slid over the dogs 14, or the dogs 14 are inserted into the depressions 16, in which the dogs 14 are then arranged with essentially no play. In this manner, a simple and simultaneously reliable coupling of the dog plate 13 to the toothed wheels 24 is ensured in order to connect different gears 6, 7 or toothed wheel pairings of different gears 6, 7 to a drive shaft 4 or an output shaft 5 of a transmission 3. As can be seen, the depressions 16 extend through the dog plate 13, so that they are accessible from both faces 25. The dog plate 13 can thus be designed to be very narrow, and the transmission 3 can therefore be designed to have a small installation footprint.

At the circumferential end of the windows 15 that is opposite of the ends of the windows 15 at which the depressions 16 are arranged, ramps 18 are arranged in the windows 15 so that a coupling of the dogs 14 in the windows 15 is prevented in a reliable and simultaneously simple manner in the event of a software error. In this case, a ramp 18 has an angle α of approximately 30° relative to the face 25, so that the dog 14 is reliably guided out of the window 15.

Figure 7:
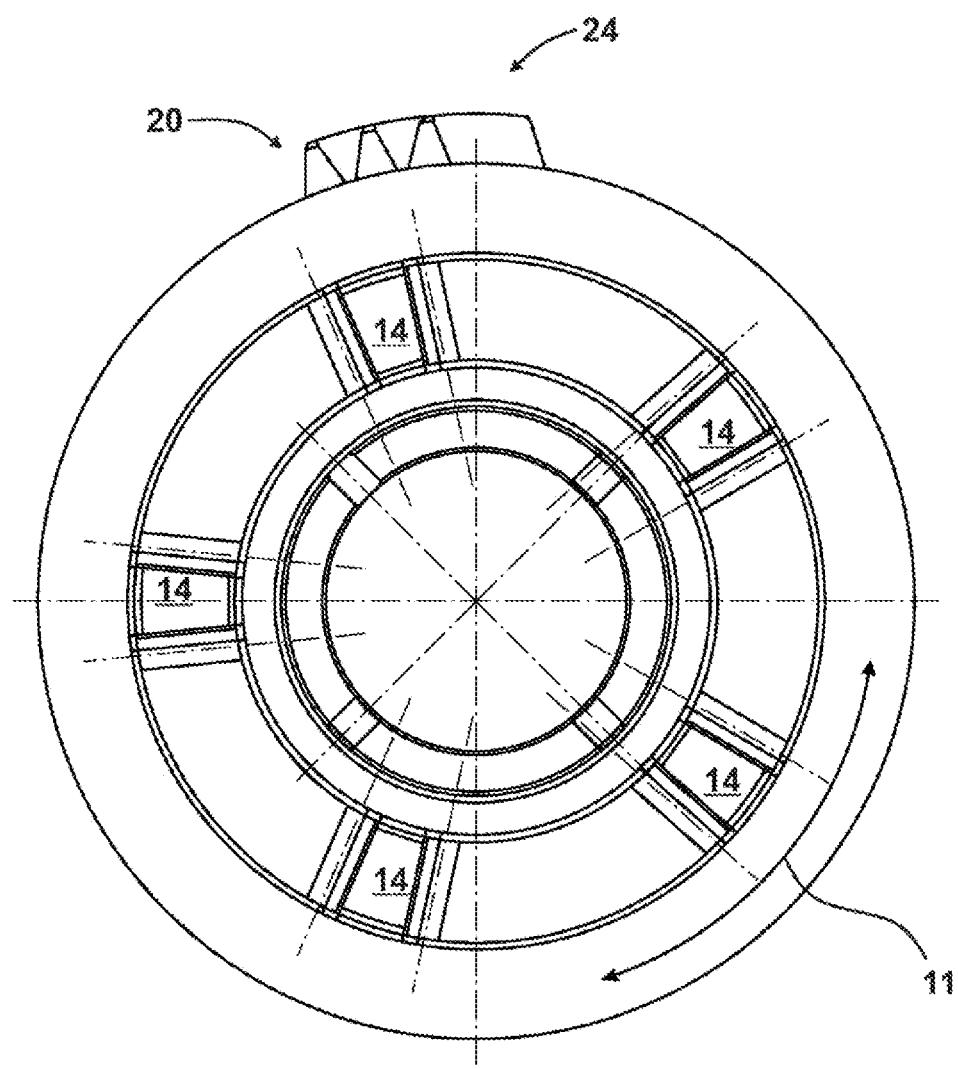
FIGS. 7 through 9 show a toothed wheel of a gear of a drive according to the invention in different views.
Figure 8:
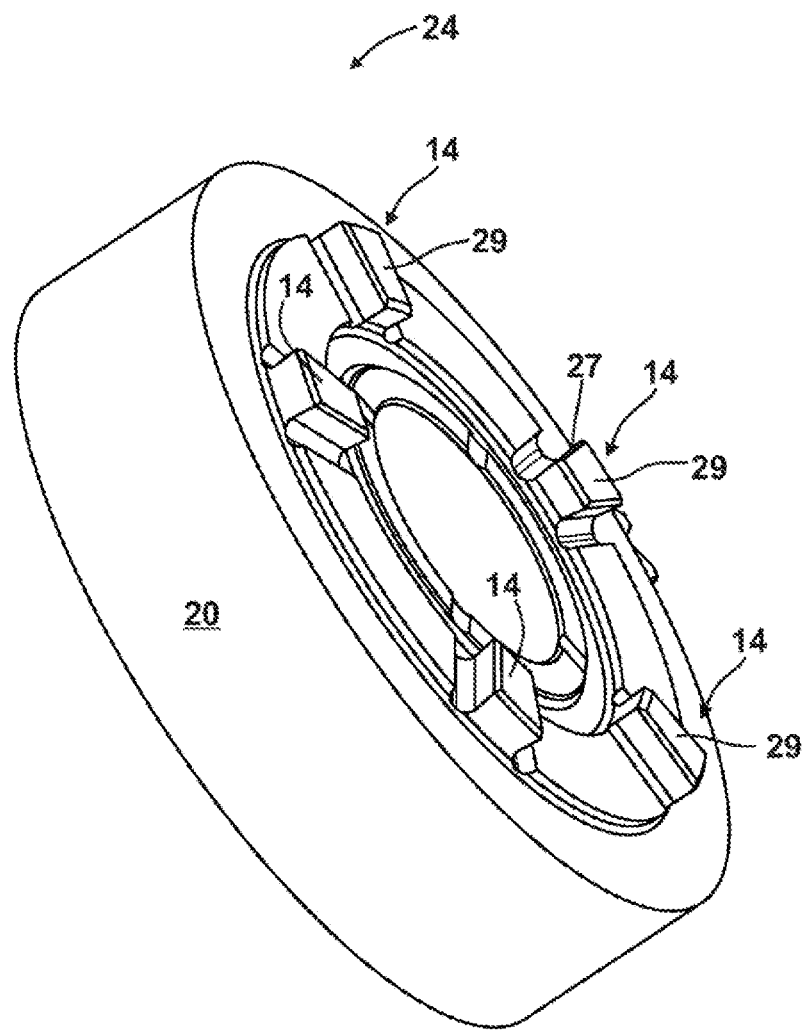
Figure 9:
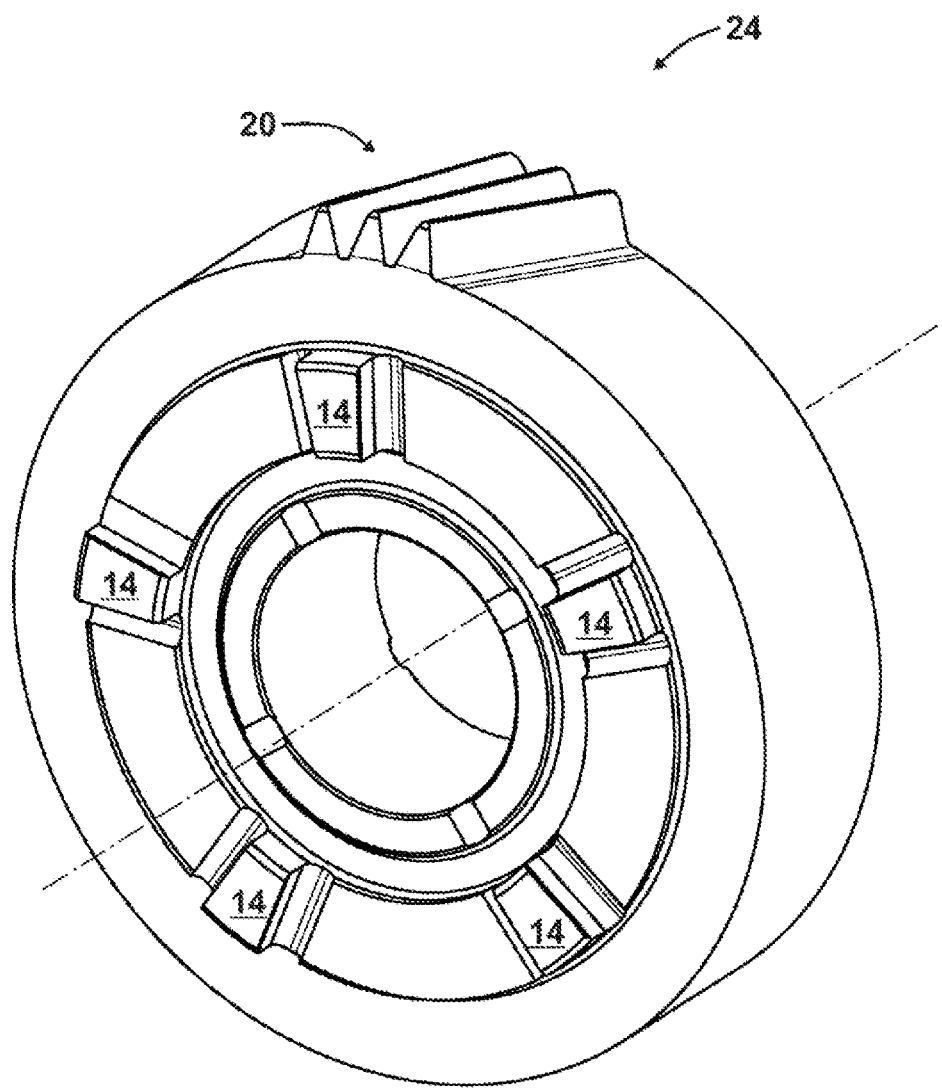

FIGS. 7 through 9 schematically show an output-side toothed wheel 24 of the first gear 6 or of the second gear 7, or of the toothed gear pairing forming the first gear 6 or the second gear 7. Even though only three teeth are illustrated, it is understood that the toothed wheel 24 comprises teeth along the entire circumference, which teeth can be designed to be parallel to the axis or, as illustrated, can be designed as helical toothing. In the transmission 3, these teeth are engaged with teeth of the toothed wheel 24 connected in a rotationally fixed manner to the drive shaft 4 in the drive 1 illustrated in FIG. 3. The toothed wheel 24 illustrated furthermore comprises on a face 25 five dogs 14 which correspond to the depressions 16 of the dog plate 13 and can engage in the depressions 16 in order to connect the output-side toothed wheel 24 to the output shaft 5 in a rotationally fixed manner and thus connect the drive shaft 4 to the output shaft 5 via the corresponding gear.

As can be seen in FIG. 8, the dogs 14 comprise chamfers 27 on circumferential edges, wherein an angle α of the chamfers 27 corresponds to an angle α of the ramp 18. As can furthermore be seen, the dogs 14 comprise at an upper end or an axial end a cap surface 29 which, in terms of orientation, corresponds to an orientation of the base 28 of the window 15. Thus, in an engagement process, a continuous planar contact between the dog 14 and the dog plate 13 is possible, namely first between the chamfer 27 and the ramp 18 and then, once the dog 14 has reached the base 28 of the window 15, between the cap surface 29 and the base 28 of the window 15, until the dog engages in the depression.

Figure 10:
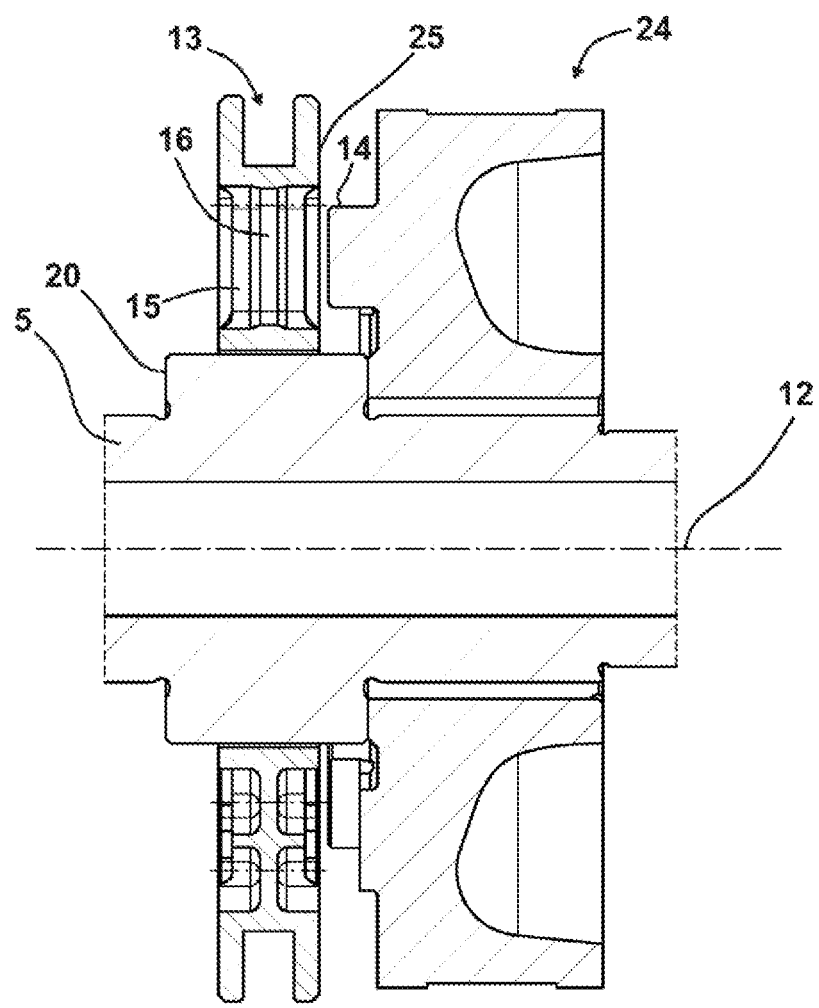
FIGS. 10 through 12 show different method steps of a disengaging process in detail.
Figure 11:
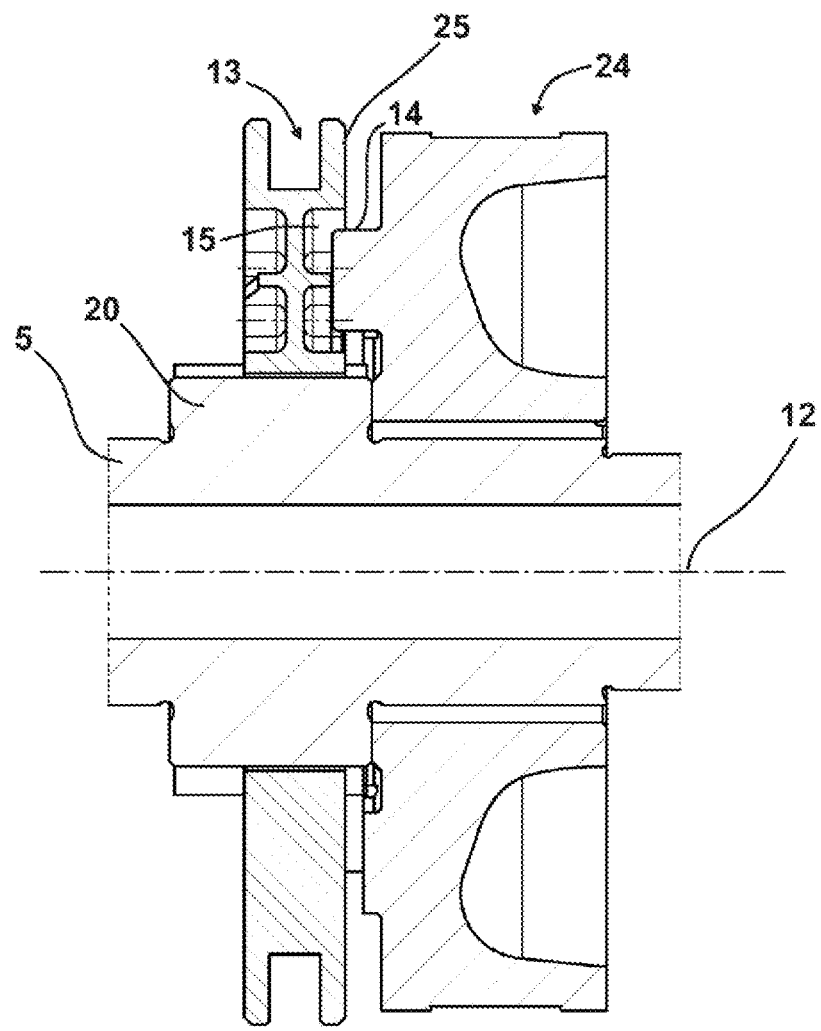
Figure 12:
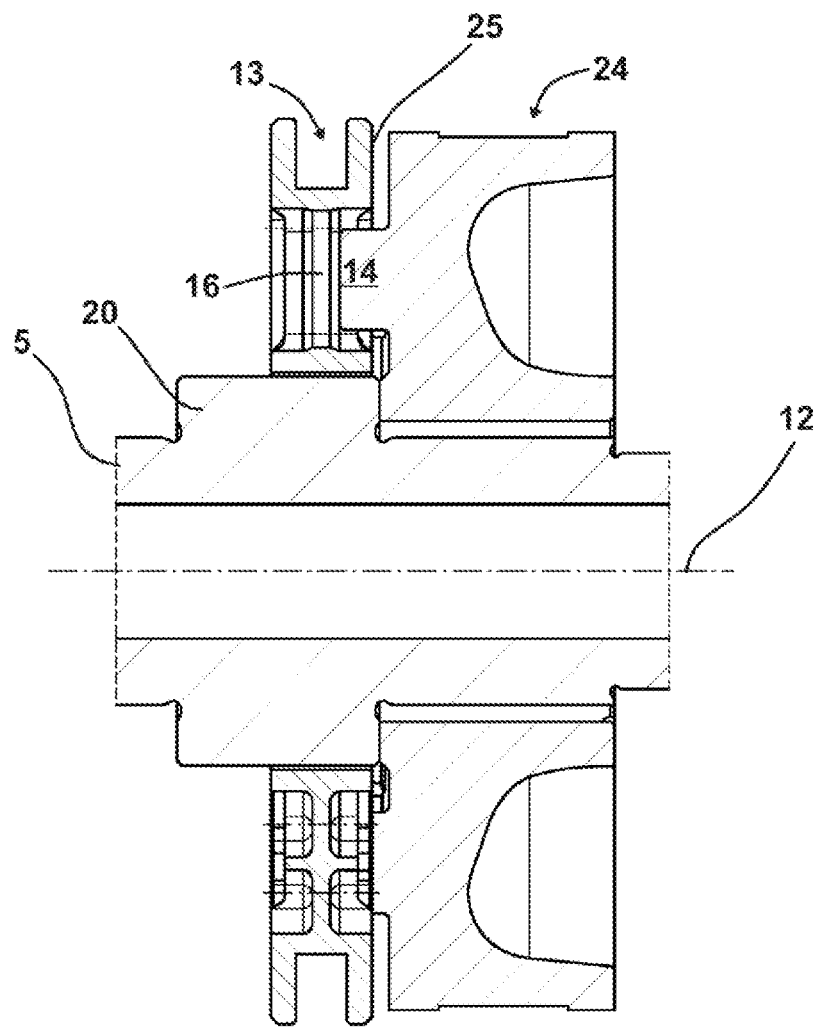

FIGS. 10 through 12 show a coupling process in different method states, in which process a toothed wheel 24 illustrated in FIGS. 7 through 9 is connected in a rotationally fixed manner to a dog plate 13 according to FIGS. 4 through 6.

Respectively illustrated are the output shaft 5 with an outer toothing 20, on which the dog plate 13 is arranged such that it can be moved in an axial direction and is connected to the output shaft 5 in a rotationally fixed manner, as well as a toothed wheel 24 of a toothed wheel pairing, which toothed wheel 24 is connected to the output shaft 5 via the dog plate 13.

As can be seen in the state illustrated in FIG. 10, the dog plate 13 is spaced apart from the toothed wheel 24 so that the toothed wheel 24 is not kinematically coupled to the output shaft 5 in a circumferential direction I 1. In other words, the corresponding gear is not engaged.

FIG. 11 shows a state in which the dog plate 13 was moved axially towards the toothed wheel 24. In this state, the dog 14 is already positioned in the window 15 of the dog plate 13, but has not yet engaged in the depression 16. Since the window 15 is larger than the dog 14 in a circumferential direction 11, a relative movement between the dog plate 13, or the output shaft 5 that is connected to the dog plate 13 in a rotationally fixed manner, and the toothed wheel 24 is still possible.

FIG. 12 shows a fully engaged state in which the dogs 14 of the toothed wheel 24 are arranged in the depressions 16 of the dog plate 13, so that a rotationally fixed and essentially play-free connection is present. In a circumferential direction 11, the dogs 14 are then positioned against the stop 17 in the windows 15. Because the depressions 16 correspond to the dogs 14, the dogs 14 are arranged in the depressions 16 with essentially no play, so that no further relative movement is possible. A connection in which a play of less than 5°, in particular less than 2°, and/or a play of less than 20 mm, in particular less than 10 mm, preferably less than 5 mm, is possible in a circumferential direction 11 can thereby also be considered as a connection that is essentially free of play. In particular, the introduction of a dog 14 comprising an undercut into the depression 16 is thus easily possible.

Of course, an output-side toothed wheel 24 of another gear that, for the sake of better visualization, is not illustrated here, can be positioned at the second face 25 of the dog plate 13, so that optionally one of the two gears 6, 7 can be connected to the output shaft 5 by means of a displacement of the dog plate 13. It is furthermore possible to position the dog plate 13 in a middle position illustrated in FIG. 11 in which neither of the two gears 6, 7 is engaged.

The two gears 6, 7 are typically formed by toothed wheel pairings with different transmission ratios, which pairings can be permanently connected in a rotationally fixed manner to the drive shaft 4 and alternately connected to the output shaft 5 via the dog plate 13.

During a shifting process from one gear to another, the electric motor 2 is electrically accelerated or braked in order to produce a virtually synchronous rotational speed between the dog plate 13 and the toothed gear 24 that is to be connected to the output shaft 5 via the dog plate 13. A corresponding shifting process typically occurs in less than one second, preferably within less than 150 milliseconds, so that the electric motor 2 must be accelerated or braked in a correspondingly short amount of time. Normally, this takes place via an inverter 10 and a storage battery 9 in which electric energy can be stored and from which electric energy can be drawn in order to effect the change in rotational speed.

Because the synchronization occurs electrically, it is mostly possible to forgo friction surfaces in the transmission 3, so that the transmission 3 can be designed in a simple manner, typically with component parts composed of a case-hardened steel or the like. Furthermore, because of the electric synchronization, a lower cooling capacity is sufficient, so that a transmission case can also be constructed in a simple manner.

With a drive 1 according to the invention, a shifting process between gears 6, 7 of a drive 1, which can be arranged in an electric vehicle for example, is easily feasible. The drive 1 can be designed to be particularly cost-effective and simultaneously robust, since the synchronizing function has essentially been removed from the mechanical sphere of the transmission 3 and moved to the electrical unit.

The invention claimed is:

1. A drive comprising:
an electric motor; and
a transmission to which the electric motor is configured to be connected at a drive shaft for an electric vehicle;
wherein the transmission comprises at least two gears with different transmission ratios, via which an output shaft can be alternately coupled to the drive shaft in order to achieve different transmission ratios of a rotational speed of the drive shaft to a rotational speed of the output shaft;
wherein the transmission is designed to carry out a shifting process in which a coupling of the drive shaft, driven by the electric motor rotating at a first rotational speed, to the output shaft via a first gear with a first transmission ratio is first released, so that the drive shaft is no longer rotationally coupled to the output shaft, after which the drive shaft is rotationally coupled to the output shaft via a second gear with a second transmission ratio;
wherein an electric synchronizing device is provided with which a rotational speed of the electric motor can be changed to a second rotational speed for a duration of the shifting process;
wherein the second rotational speed corresponds to the first rotational speed multiplied by a quotient of the second transmission ratio and first transmission ratio;
wherein the drive is designed to produce a releasable rotational coupling between the drive shaft and the output shaft via the second gear by a positive engagement;
wherein the drive shaft is configured to be releasably coupled to the output shaft via a gear by at least one dog that engages in a depression; and
wherein the depression is arranged in a window which extends along a direction along which an element coupled to the drive shaft can be moved in relation to an element coupled to the output shaft when the output shaft is not coupled to the drive shaft during a shifting process, so that the dog can be moved into the depression through the window from an uncoupled state.

2. The drive according to claim 1, wherein:
for the purpose of producing a releasable rotational, positively engaged connection between the drive shaft and the output shaft, the drive comprises a rotatable first element with a window in which a stop is arranged and a rotatable second element with a protrusion, the at least one dog being configured to be inserted into the window, wherein a rotational movement can be transmitted from the second element to the first element in positive engagement by the protrusion.

3. The drive according to claim 1, wherein:
the drive is designed to carry out a shifting process in which the duration of the shifting process is less than one second.

4. The drive according to claim 3, wherein:
the drive is designed to carry out a shifting process in which the duration of the shifting process is less than 150 ms.

5. The drive according to claim 1, wherein:
a storage battery is connected to the electric motor, in which storage battery electric energy that is created in the electric motor during a deceleration process can be stored.

6. The drive according to claim 1, wherein:
at least one coupling element is provided that is connected to the drive shaft or the output shaft in positive engagement in a first direction, that is, in a circumferential direction, and movably in a second direction, that is, in an axial direction, in order to releasably connect at least one gear to the drive shaft or the output shaft.

7. The drive according to claim 6, wherein:
the at least one coupling element can be releasably connected to the at least one gear in positive engagement.

8. The drive according to claim 7, wherein:
the coupling element can be connected to the first gear on a first side and to the second gear on a second side.

9. The drive according to claim 1, wherein:
the dog and the depression are designed such that the dog has a play of less than 20 mm in relation to the depression when the drive shaft is coupled to the output shaft.

10. The drive according to claim 1, wherein:
the dog and the depression are designed such that the dog has a play of less than 10 mm in relation to the depression when the drive shaft is coupled to the output shaft.

11. The drive according to claim 1, wherein:
the dog and the depression are designed such that the dog has a play of less than 5 mm in relation to the depression when the drive shaft is coupled to the output shaft.

12. The drive according to claim 1, wherein:
the dog can be positioned in the depression with essentially no play.

13. The drive according to claim 1, wherein:
the depression is arranged at an end of the window.

14. The drive according to claim 1, wherein:
the first gear is formed by a first toothed wheel pairing and the second gear is formed by a second toothed wheel pairing.

15. The drive according to claim 14, wherein:
the toothed wheel pairings are connected to the drive shaft in a rotationally fixed manner and can be connected to the output shaft via at least one coupling element designed as a dog plate, wherein the dog plate is connected to the output shaft in positive engagement in a circumferential direction and can be displaced in relation to the output shaft in an axial direction.

16. The drive according to claim 15, wherein:
output-side toothed wheels of the toothed wheel pairings respectively comprise at least one dog that extends in an axial direction and correspond to depressions in a face of the dog plate.

17. The drive according to claim 15, wherein:
output-side toothed wheels of the toothed wheel pairings respectively comprise two to seven three to five dogs that extend in an axial direction and correspond to depressions in a face of the dog plate.

18. The drive according to claim 15, wherein:
output-side toothed wheels of the toothed wheel pairings respectively comprise three to five dogs that extend in an axial direction and correspond to depressions in a face of the dog plate.

19. The drive according to claim 15, wherein:
each of the depressions in the dog plate that corresponds to the dogs is arranged in the window that runs along a circumferential direction, wherein the depression is arranged at an end in the window in the circumferential direction.

20. The drive according to claim 19, wherein:
the window comprises a ramp at an end opposite of the depression.

21. The drive according to claim 20, wherein:
the ramp comprises a surface that is arranged at an angle in relation to a base of the window and connects the base of the window to the face.

22. The drive according to claim 1, wherein:
the at least one dog comprises a chamfer on an edge, wherein an angle of the chamfer corresponds to an angle of the ramp, so that the dog can slide from a face area into the window via the ramp by planar contact between the chamfer and the ramp.

23. The drive according to claim 1, wherein:
the at least one dog comprises a cap surface, wherein an orientation of the cap surface corresponds to an orientation of a base of the window, so that the dog can slide from the ramp into the depression via the base by planar contact between the cap surface and the base.

24. The drive according to claim 20, wherein:
the depressions comprise an undercut.

25. The drive according to claim 1, wherein:
for coupling the drive shaft to the output shaft via at least one gear, a coupling element is provided and is movably arranged in the transmission such that it is connected to the drive shaft or output shaft in a rotationally fixed manner and can be displaced along an axial direction.

26. An electrical vehicle with a drive, wherein:
the drive is designed according to claim 1.

27. A coupling element for a drive according to claim 1, wherein:
the at least one window which extends over a portion of a circumference of the coupling element is provided on a face, wherein at a circumferential end of the window the depression is arranged in which the dog that corresponds to the depression can engage.

28. The coupling element according to claim 27, wherein:
the coupling element is designed as a dog plate that is roughly symmetric in relation to a central plane.

29. The coupling element according to claim 27, wherein:
the coupling element comprises an inner toothing for a positively engaged coupling to an output shaft.

30. The coupling element according to claim 27, wherein:
the coupling element can be actuated via a spring.

31. A method for operating a drive according to claim 1, that comprises the electric motor and the transmission connected to the electric motor, wherein the transmission comprises the at least two gears with different transmission ratios via which the output shaft can be coupled to the drive shaft in order to achieve different transmission ratios of the rotational speed of the drive shaft to the rotational speed of the output shaft, the method comprising:
- a shifting process occurs in which a rotational coupling of the drive shaft, driven by the electric motor rotating at the first rotational speed, to the output shaft via a first gear with a first transmission ratio is first released, so that the drive shaft is no longer rotationally coupled to the output shaft, after which the drive shaft is rotationally coupled to the output shaft via the second gear with the second transmission ratio;
- wherein the rotational speed of the electric motor is changed to roughly the second rotational speed by an electric synchronizing device for the duration of the shifting process in that the electric motor is accelerated or braked, wherein the second rotational speed corresponds to the first rotational speed multiplied by the quotient of the second transmission ratio and first transmission ratio; and, after which,
- rotationally coupling the drive shaft to the output shaft by positive engagement.

32. The method according to claim 31, wherein:
an energy for accelerating the electric motor is drawn from a storage battery.

33. The method according to claim 31, wherein:
during deceleration, kinetic energy is converted into electric energy and at least partially stored in a storage battery.

\* \* \* \* \*